United States Patent

Iwasaki et al.

[15] 3,667,047

[45] May 30, 1972

[54] IMPROVED SPEECH ARTICULATION FREQUENCY MODULATION COMMUNICATION SYSTEM

[72] Inventors: Masahiro Iwasaki; Nobuyuki Goto, both of Yokohama-shi; Hiroya Fujisaki; Kunihiko Niwa, both of Tokyo, all of Japan

[73] Assignee: Tokyo Shibaura Electric Co., Ltd., Kawasaki-shi, Japan

[22] Filed: Oct. 7, 1969

[21] Appl. No.: 864,492

[30] Foreign Application Priority Data

Oct. 11, 1968 Japan....................................43/73744
Oct. 11, 1968 Japan....................................43/73745
Oct. 11, 1968 Japan....................................43/73746

[52] U.S. Cl. ................................325/45, 179/1 SA, 325/32, 325/65

[51] Int. Cl. ........................................................H04b 1/66

[58] Field of Search......................325/32, 35, 45, 46, 59, 61, 325/62, 65; 179/1 D, 1 P, 1 SA, 15.55; 333/14, 28, 28 A

[56] References Cited

UNITED STATES PATENTS

| | | | |
|---|---|---|---|
| 2,179,182 | 11/1939 | Hansell | 333/28 A X |
| 2,362,000 | 11/1944 | Tunick | 325/46 X |
| 2,407,259 | 9/1946 | Dickieson | 325/35 |
| 3,457,370 | 7/1969 | Boner | 179/1 D |
| 3,478,169 | 11/1969 | Saito | 325/45 X |
| 3,500,206 | 3/1970 | Kaneko et al. | 325/46 |
| 3,504,115 | 3/1970 | Suzuki et al | 325/45 X |

*Primary Examiner*—Benedict V. Safourek
*Attorney*—Flynn & Frishauf

[57] ABSTRACT

The present invention provides a frequency modulation communication system wherein there is disposed in the transmitting side a first filter capable of furnishing transmission signals with such frequency characteristics of the voiced and unvoiced speech signal components as to allow information to be transmitted at the maximum rate possible with said transmission signals as well as with the transmission channel used and in the receiving side a second filter capable of bringing the frequency characteristics of signals received and frequency demodulated there back to the original state when said received signals were initially transmitted, thereby enabling the articulation of transmission signals to be improved with the said transmission channel, or enabling the same articulation of transmission signals to be maintained with a compressed frequency band width of the transmission channel and the prescribed frequency bandwidth to be compressed without any inconvenience.

9 Claims, 17 Drawing Figures

IMPROVED SPEECH ARTICULATION FREQUENCY MODULATION COMMUNICATION SYSTEM

The present invention relates to a frequency modulation communication system wherein speech signals, whose quality is detectable from their articulation, are transmitted in a transmission channel with improved articulation, or with their inherent articulation in a transmission channel of bandwidth compressed by determining the characteristics of filters according to those of the speech signals.

Heretofore, the mobile wireless communication system used in rolling stock and shipping has been of a frequency modulation type. As a result of recent increases in subscribers, however, there has grown interference among such systems used by them, and there is raised a problem as to deficiency in the forms of frequency bands. To overcome these difficulties, there is practised a process of limiting the conventional 50KHz bandwidth per transmission channel to half its value or a bandwidth of 25KHz. There still remains the necessity of further reduction of the bandwidth.

On the other hand, the limitation of a prescribed frequency bandwidth leads to a degraded articulation, because when the signal-to-noise ratio limits the frequency bandwidth, there occurs a reduction of said ratio, which adversely degrades the articulation. The resultant question is, therefore, how said prescribed frequency bandwidth can be compressed without degrading the articulation.

There has heretofore been known a communication system which uses an equalizer as a means for resolving such difficulties. According to this prior system, there are supplied transmission signals to a transmission equalizer which allows the amplitude-frequency characteristics of said transmission signals to be varied in direct proportion to the frequency of said transmission signals. Outputs from the equalizer are modulated by a frequency modulator and sent to a receiver from a transmitter through a wireless transmission channel. It is generally during transmission through said wireless transmission channel that there occur noises to decrease the signal-to-noise ratio.

Signals brought to the receiver are demodulated by a demodulator and pass through a reception equalizer which has an amplitude-frequency characteristic exactly the inverse to these of the aforementioned transmission equalizer. In other words, processing of signals through both transmission and reception equalizers produces demodulated outputs having only noise components equalized, while the frequency spectrum of signals remains unchanged.

However, the aforementioned frequency modulation communication system of the prior art can only improve the frequency spectrum of the noise of a frequency modulation communication system but fails to afford the best frequency spectrum of the noise in connection with specific transmission signals, particularly those representing speech. Accordingly, the communication system known to date has not offered a fully satisfactory solution for the deterioration of the articulation which unavoidably accompanies the compression of a prescribed frequency bandwidth.

The object of the present invention is to provide a frequency modulation communication system capable of improving the articulation associated with a prescribed frequency band, thereby compressing said band insofar as said articulation is not degraded. This object can be attained by changing the frequency spectrum of specific signals, such as speech signals, in transmission and reception, namely, by providing the transmitting side with a first filter capable of furnishing transmission signals with such frequency characteristics as allow information to be transmitted at a maximum rate possible with said transmission signals as well as with the transmission channel used, and by providing the receiving side with a second filter capable of bringing the frequency characteristics of signals received and demodulated there back to the original state when said transmission signals were initially transmitted.

This invention can be more fully understood from the following detailed description when taken in conjunction with the accompanying drawings, in which.

Figure 7:
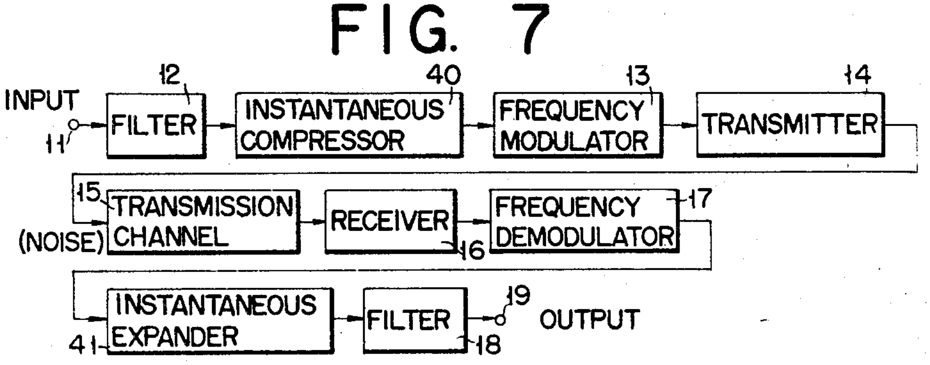
FIG. 7 is a block diagram of a frequency modulation communication system according to another embodiment of the present invention.
Figure 14:
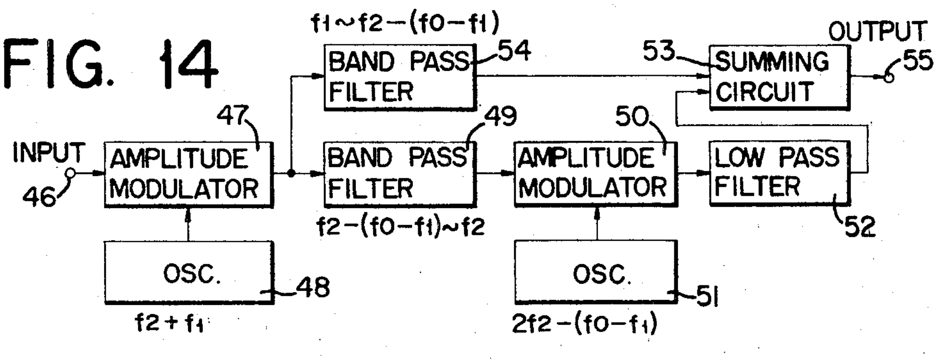
FIG. 14 is a block diagram illustrating spectrum rearranging circuit of the embodiment of FIG. 13.
Figure 15:
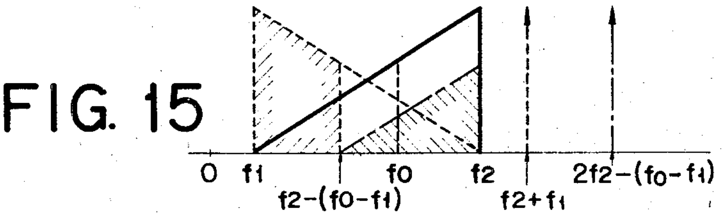
Figure 16:
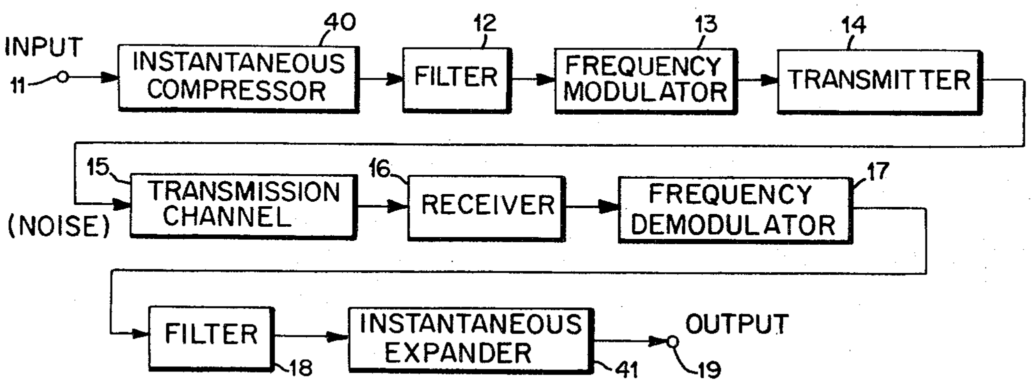

FIG. 15 presents a signal spectrum illustrating the operation of the circuit of FIG. 14;

FIG. 16 illustrates a modification of the embodiments of FIG. 7; and

Figures 8, 9, 10:
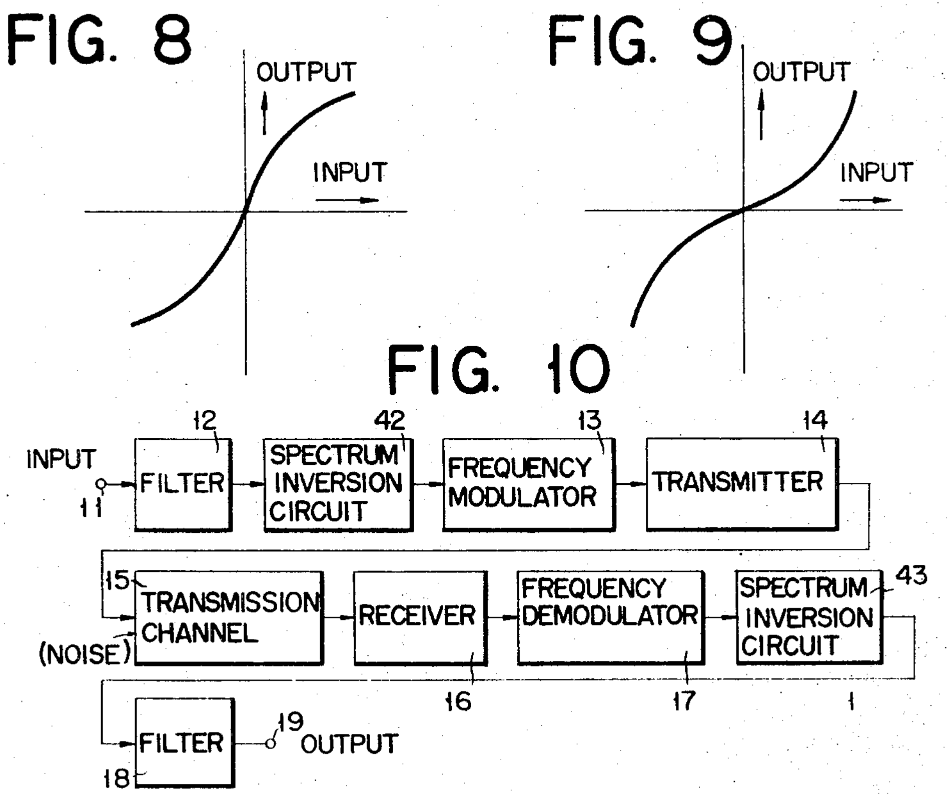
FIG. 8 is a curve illustrating the input-output characteristics of an instantaneous transmission compressor involved in the communication system of FIG. 7.
FIG. 9 is a curve showing the input-output characteristics of an instantaneous reception expander also involved in said communication system.
FIG. 10 is a block diagram of a frequency modulation communication system according to another embodiment of the invention.
Figure 17:
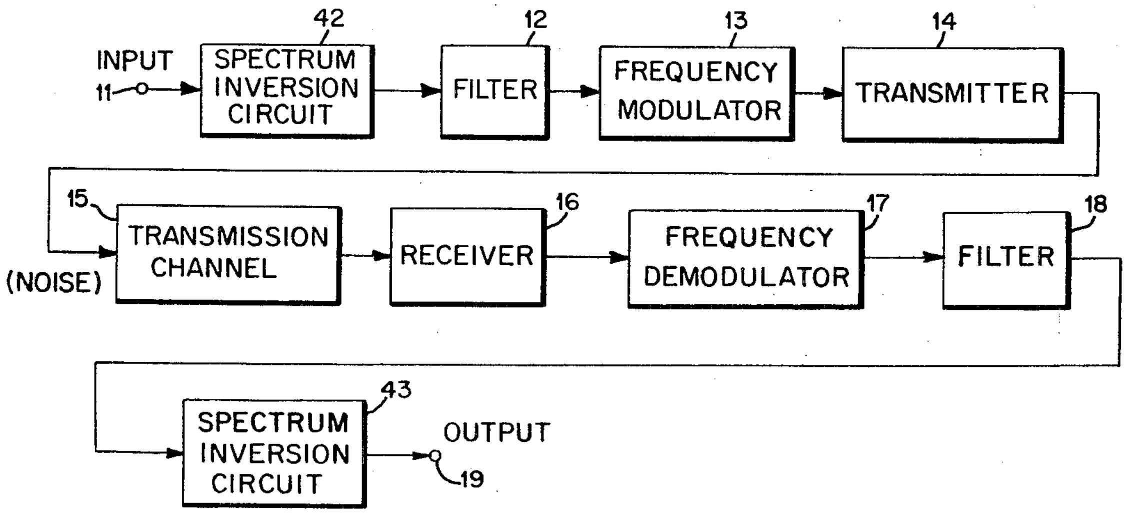

FIG. 17 illustrates a modification of the embodiment of FIG. 10.

Figure 1:
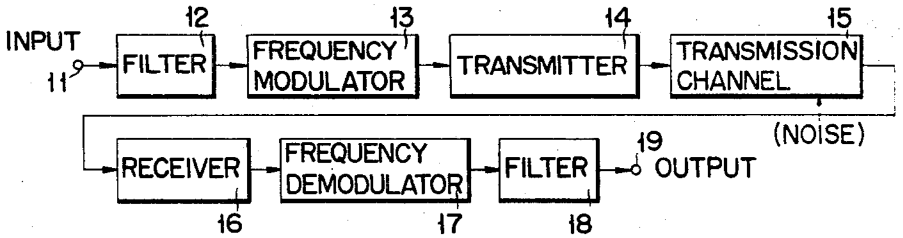
FIG. 1 is a block diagram of a frequency modulation communication system according to an embodiment of the present invention.

Referring to FIG. 1, there is supplied to a terminal 11 a speech signal from, for example, microphone. The speech signal is conducted from the terminal 11 to a transmission filter 12 which is capable of furnishing a specific input signal with such an emphasis as allows information to be transmitted at a maximum rate. The speech signal emphasized as specified is transferred from the filter 12 to a frequency modulator 13, where said emphasized signal is frequency modulated. The frequency-modulated signal is sent forth through a transmitter to a transmission channel, for example, wireless transmission channel 15. The transmission signal forwarded to signal wireless transmission channel 15 is received by a receiver 16 and demodulated by a demodulator 17. The demodulated signal from said demodulator 17 passes through a reception filter 18 which displays inverse frequency characteristics to those of the aforesaid transmission filter 12, or deemphasizing characteristics, thus producing a final received signal at a terminal 19.

There will now be described the transmission filter 12 and reception filter 18. The present invention is generally adapted to transmit by frequency modulation those signals which may be expressed as a sum of more than one kind of power spectral density functions. In the following description of input signals, there is taken an example of speech signals which consists of two different power spectral density functions.

The speech signal consists of a voiced component and voiceless (or unvoiced) component. There are diagrammatically illustrated in FIG. 2 the frequency characteristics of these components. The spectrum of the voiced component lies in a low frequency region as indicated by the solid line, while that of the voiceless component lies in a high frequency region as shown by the dashed line.

Further, the articulation of speech signals is largely affected by the frequency components thereof. While the quality of communication system is generally evaluated on the basis of the articulation of speech signals it sends forth, the voiceless component of small energy is known, under a good signal-to-noise ratio condition, to make as much contribution to said articulation as the voiced component. Accordingly, improvement of the signal-to-noise ratio with respect to the voiceless (or unvoiced) component enables articulation to be eventually increased, though the overall signal-to-noise ratio may remain unchanged. The resultant equivalent improvement in the signal-to-noise ratio will resolve the problem of the reduced signal-to-noise ratio accompanying the compression of a prescribed frequency bandwidth.

Since the articulation of speech signals is a quantity incapable of being easily computed from their frequency distribution, there will now be described an information transmission rate, a quantity closely associated with said articulation. With the regions of signal frequency denoted by $f_1$ to $f_2$, and the entropy power density of signals and noises (power spectral density of white Gaussian noises having the same entropy in the same frequency region) as $S_E(f)$ and $n_E(f)$ respectively, then the information transmission rate R may be expressed as:

$$R=\int_{f_1}^{f_2}\log_2\frac{S_E(f)+n_E(f)}{n_E(f)}\,df\text{(bit/sec.)}. \qquad (1)$$

Figure 2:
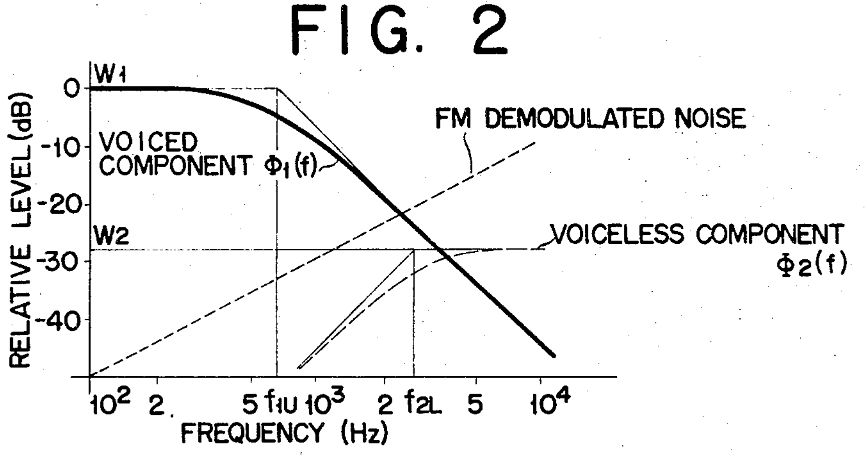
FIG. 2 is a curve showing the distribution of the general frequency spectrum of signals representing speech and frequency modulation noise.

Said rate is known to be a quantity closely associated with the articulation of speech signals, and so can be used as a measure for theoretical examination of said articulation. If, in the case of the frequency modulation communication system, the total noise power involved in the frequency band is represented by N, then there will result $$n_E(f)=(3N/f_2^3\ 31\ f_1^3)f^2 \qquad (2)$$

where:

$f_1$ : lower limit of speech frequency band $f_2$ : upper limit of the same $N$ : total noise power The power spectral density functions $\Phi_1(f)$ and $\Phi_2(f)$ of the voiced and voiceless components respectively involved in the speech signal may be approximated by $$\Phi_1(f)=W_1/[1+(f/f_{1u})^2]^2 \qquad (3)$$

$$\Phi_2(f)=W_2/[1+(f_{2l}/f)^2]^2 \qquad (4)$$

where, $W_1$, $W_2$, $f_{1u}$, $f_{2l}$ are as shown in FIG. 2.

Assuming the voiced component to have an exponential amplitude distribution and the voiceless component to have a Gaussian amplitude distribution, then their respective entropy power density may be given as:

$$S_{E2}(f)=(e/\pi)\Phi_1(f)\ \text{(voiced component)} \qquad (5)$$

$$S_{E2}(f)=\Phi_2(f)\ \text{(voiceless component)} \qquad (6)$$

Figure 3:
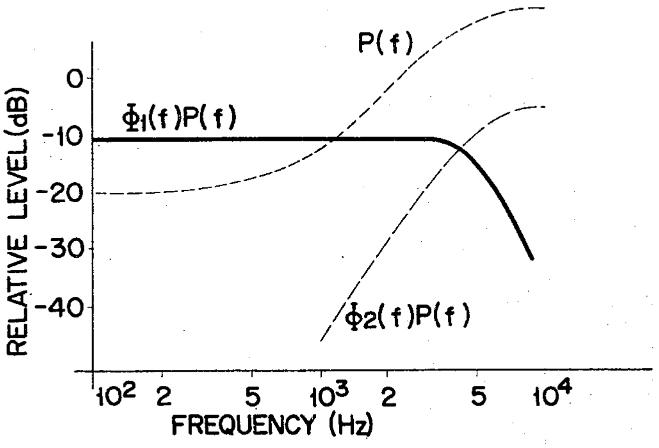
FIG. 3 is a curve showing the distribution of the frequency spectrum of signals representing speech and frequency modulation noise according to the frequency modulation communication system of the invention.

From the equations above can be computed the information transmission rate R. Let it be assumed that there is adopted a communication system wherein there is introduced a signal, as shown in FIG. 3, into a modulator 13 through a transmission filter 12 having the frequency characteristics in which the power transfer ratio is $P(f)$ and then after demodulation, is regenerated through a reception filter 18 having the frequency characteristics of which the power transfer ratio is $1/P(f)$. Then the entropy power density of output noises will be modified by a factor of $1/P(f)$. Accordingly, the information transmission rate $R_i$ ($i=1, 2$) of said communication system may be given as below with respect to the voiced and voiceless components:

$$R_i=\int_{f_1}^{f_2}\log_2\left\{1+\frac{S_{Ei}(f)}{n_E(f)/P(f)}\right\}df\text{(bit/sec.)} \qquad (7)$$

where:

$i=1, 2$ ($i=1$ : voiced component)

($i=2$ : voiceless component)

With the time ratio occupied by the interval of the voiced component designated as $\alpha$, the overall information transmission rate R will be $$R=\alpha R_1+(1-\alpha)R_2 \qquad (8)$$

Since, with the frequency modulation communication system, there is imposed limitation on a prescribed frequency bandwidth, it is necessary to restrict frequency deviation and in consequence the peak value of input signals supplied to a modulator below a certain value. If, at this time, the peak factor of signal remains unchanged after passing them through the prescribed filter 12, then limitation of peak value will be equivalent to that of r.m.s. value. If, therefore, there is determined a frequency characteristic of $P(f)$ as maximizes equation (8) above, while r.m.s. value of the signal power is restricted to below a certain value, then there will be imparted optimum characteristics to transmission signals. The power of the speech signal may be given as $$S_i=\int_{f_1}^{f_2}\phi_i(f)df. \qquad (9)$$

Since the power $S_1$ of the voiced component is larger than that of the voiceless component, the power of any of the signals which have passed through the first filter 12 (FIG. 1) should not exceed the value of $S_1$. The power transfer ratio $P(f)$ can be determined with respect to the power of signals passing through said filter 12 by maximizing the overall information transmission rate R, insofar as there can be established the conditions given below, $$\int_{f_1}^{f_2}\phi_1(f)P(f)df\leqq S_1 \qquad (10)$$

$$\int_{f_1}^{f_2}\phi_2(f)P(f)df\leqq S_1 \qquad (11)$$

and also the conditions for the realizable characteristics $$P(f)\geqslant 0(f_1\leqslant f\leqslant f_2) \qquad (12)$$

Let it be assumed that $\alpha=1/2$ in equation (8), the frequency bands have values as $f_1$ = 50 Hz, and, based on the values published in the literature, $f_{1u}$ = 800 Hz, $f_{2l}$ = 2,500 Hz and $W_1/W$ = 560. Then there will be derived by Lagrange's method $$P(f)=S_1/=\lambda\Phi_1(f)=\mu\Phi_2(f) \qquad (13)$$

where $\lambda$ and $\mu$ are computed from the equation given below $$\int_{f_1}^{f_2}\frac{\phi_1(f)}{\lambda\phi_1(f)+\mu\phi_2(f)}df=\int_{f_1}^{f_2}\frac{\phi_2(f)}{\lambda\phi_1(f)+\mu\phi_2(f)} \qquad (14)$$

and in this case have the following values:

$\lambda=5.17\times10^3$ $\mu=2.78\times10^3$

Therefore, the frequency characteristics of an optimum filter may be determined as follows:

$$P(f)=\frac{S_1\times10^{-3}}{5.17\times\phi_1(f)+2.78\times\phi_2(f)} \qquad (15)$$

Accordingly, it is preferred that the transmission filter 12 be of the type having the aforementioned frequency characteristics $P(f)$ and the reception filter 18 be of the type having frequency characteristics equivalent of $1/P(f)$.

FIG. 3 diagrammatically shows the feature of a filter having frequency characteristics denoted by equation (15) above and the frequency spectrum of speech signals which have passed through said filter. It is seen from the figure that articulation is improved due to the stronger emphasis of the high frequency region than in the prior art where there is concentrated the frequency spectrum of the voiceless component which exerts a significant effect on articulation.

Figure 4:
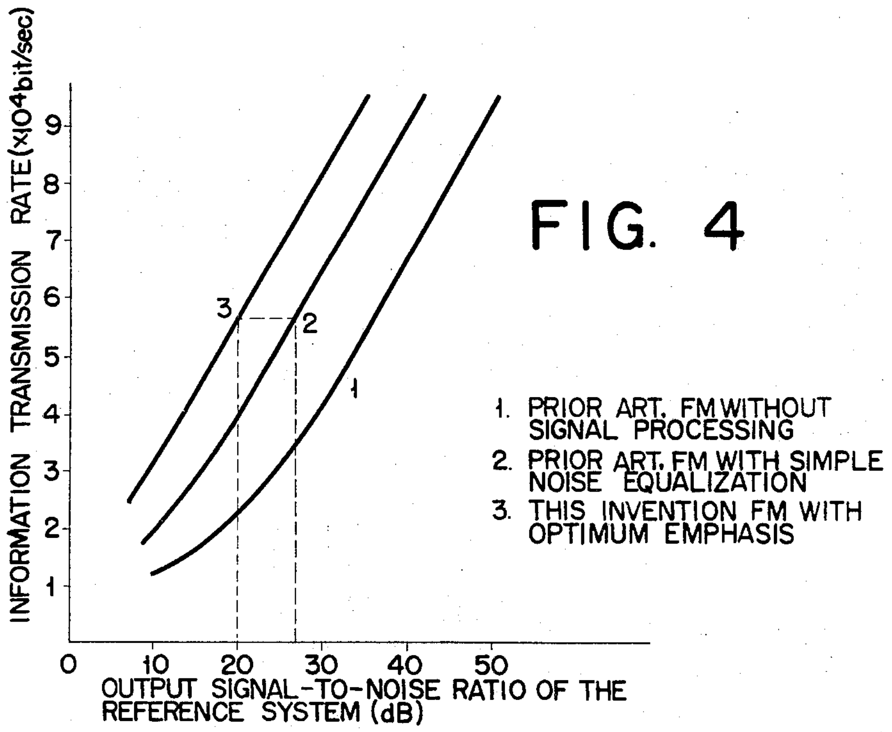
FIG. 4 is a curve showing the relation of signal-to-noise ratio versus information-transmission rate associated with the frequency modulation communication system of the present invention in comparison with that of the prior art.

FIG. 4 presents the information transmission rate of the frequency modulation communication system using a filter having frequency characteristics represented by equation (15) above (curve 3) in comparison with that of another type of frequency modulation communication system without any processings of signals, (curve 1) and that of the conventional communication system using an equalizer (curve 2). As apparent from the figure, the frequency modulation communication system of the present invention using a filter having frequency characteristics indicated by equation (15) above can be well reduced about 6dB in the signal-to-noise ratio as compared with the prior art frequency modulation systems in terms of the same information transmission rate. Based on the same quality of communication, therefore, the present invention permits the prescribed frequency bandwidth to be compressed to about half of what has hitherto been required for the prior art system, a prominent reduction of said bandwidth.

Further, the filter characteristics denoted by equation (15) above may be approximated by providing in a complex frequency plane a double zero on a negative real axis and a pair of complex poles, as shown by the following equation.

$$P(f)=K\cdot\frac{(S+\omega_0)^2}{S^2+2\delta_p\omega_p S+\omega_p^2} \qquad (16)$$

where:

$\omega_0$ = angular frequency of zero $\omega_p$ = angular frequency of pole

Figure 5:
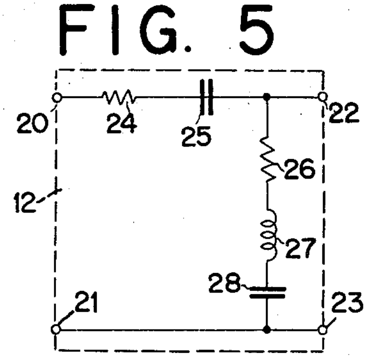
FIG. 5 is a circuit diagram of a transmission filter according to the aforementioned embodiment of the invention.

Said filter characteristics, except for a certain gain, may be realized using such a circuit as shown in FIG. 5. According to this figure, one terminal 20 of the two input terminals 20 and 21 is connected to one terminal 22 of the two output terminals 22 and 23 through a first resistor 24 and first condenser 25. Said output terminal 22 is connected to the other output terminal 23 through a second resistor 26, coil 27 and second condenser 28. With the resistance values of the resistors 24 and 26 represented by $R_1$ and $R_2$ respectively, the capacities of the condensers 25 and 28 by $C_1$ and $C_2$ respectively and the inductance of the coil 27 by L, then the frequency characteristics in this case may be expressed as $$\omega_0=\frac{1}{\sqrt{C_2L}}$$

$$\omega_p=\sqrt{\frac{C_1+C_2}{C_1C_2}\cdot\frac{1}{L}}$$

$$\delta_p=\frac{R_1+R_2}{2}\sqrt{\frac{C_1C_2}{C_1+C_2}\cdot\frac{1}{L}}$$

where:

$$\frac{1}{\sqrt{C_2L}}=\frac{R_2}{2L}$$

Figure 6:
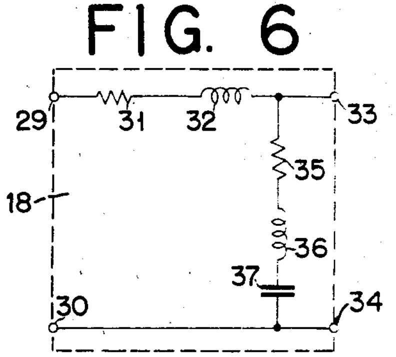
FIG. 6 is a circuit diagram of a reception filter according to said embodiment.

On the other hand, the filter 18 having exactly inverse frequency characteristics to those of the filter 12 of FIG. 5 may be realized, except for a certain gain, using such a circuit as shown in FIG. 6. One terminal 29 of the two input terminals 29 and 30 is connected to one terminal 33 of the two output terminals 33 and 34 through a first resistor 31 and first coil 32. Said output terminal 33 is connected to the other output terminal 34 through a second resistor 35, second coil 36 and condenser 37. With the resistance values of the resistors 31 and 35 denoted as $R_3$ and $R_4$ respectively, the capacity of the condenser 37 and $C_3$ and the inductances of the coils 32 and 36 as $L_2$ and $L_3$ respectively, then the frequency characteristics in this case may be given as below $$\omega_0=\frac{1}{\sqrt{C_3L_3}}$$

$$\omega_p=\sqrt{\frac{1}{C_3(L_2+L_3)}}$$

$$\delta_0=\frac{R_4}{2}\sqrt{\frac{C_3}{L_3}}$$

where:

$$\frac{1}{\sqrt{C_3(L_2+L_3)}}=\frac{R_3+R_4}{2(L_2+L_3)}$$

As mentioned above, the present invention provides a very effective means which is capable due to advanced mechanism of compressing the prescribed frequency bandwidth to a fraction of what has been required for the prior art system using a simple circuit without reducing the frequency bandwidth of speech signals themselves, minimizing mutual interference among the communication systems and advantageously utilizing electrical waves (frequency bands).

FIG. 7 represents another embodiment of the present invention wherein, for further improvement in the apparatus of FIG. 1, there is connected in the transmission side an instantaneous compressor 40 between the filter 12 and modulator 13 and on the receiving side an instantaneous expander 41 between the demodulator 17 and filter 18. If, the filter 12 and compressor 40, as well as the expander 41 and filter 18, are rearranged in the order, then there will be obtained the effect of further improvement.

The apparatus of FIG. 1 indeed gives good results where the relative intensity of speech remains constant, but in fact such intensity widely varies from time to time even with the same person and moreover the average volume of speech also change from individual to individual. Accordingly, there are occasions where mere application of filters 12 and 18 will not fully serve the purpose. The embodiment of FIG. 7 represents improvement in this respect. The instantaneous compressor 40 has input-output characteristics as shown in FIG. 8 and the instantaneous expander 41 has input-output characteristics as shown in FIG. 9. This device amplifies low level speech signals and reduces excessive speech signals, thereby improving the signal-to-noise ratio and in consequence articulation and also preventing frequencies from becoming unduly large.

Since the amplitude at the input side of the frequency modulator 13 approaches a fixed value, it is unnecessary to allow a high level for the maximum magnitude of said speech in order to ensure a high signal-to-noise ratio for low level speech signals. On the basis of the same signal-to-noise ratio, therefore, the frequency deviation is minimized, enabling the prescribed frequency bandwidth to be effectively compressed.

FIG. 16 illustrates a modification of FIG. 7 with the positions of filter 12 and compressor 40 reversed and the positions of the filter 18 and expander 41 reversed. This arrangement operates similarly to the arrangement of FIG. 7.

Replacement of the aforesaid instantaneous compressor 40 and expander 41 with a syllabic compressor and syllabic expander respectively will give the same result.

FIG. 10 is still another embodiment of the present invention, wherein, for further improvement in the apparatus of FIG. 1, there is connected in the transmission side a first frequency spectrum inverter 42 between the filter 12 and modulator 13 and in the receiving side a second frequency spectrum inverter 43 between the demodulator 17 and filter 18. The embodiment of FIG. 10 is intended to match frequency modulation noises using frequency spectrum inversion circuits 42 and 43 in the transmission and receiving sides respectively. The power spectral density $n_E(f)$ of frequency modulation noises may be expressed as $$n_E(f)=(3N/f_2^3-f_1^3)\,f^2 \qquad (17)$$

In the case of spectrum inversion, there will result $$n_R(f)=3N/f_2^3-f_1^3\,(f-f_2)^2 \qquad (18)$$

Figure 12:
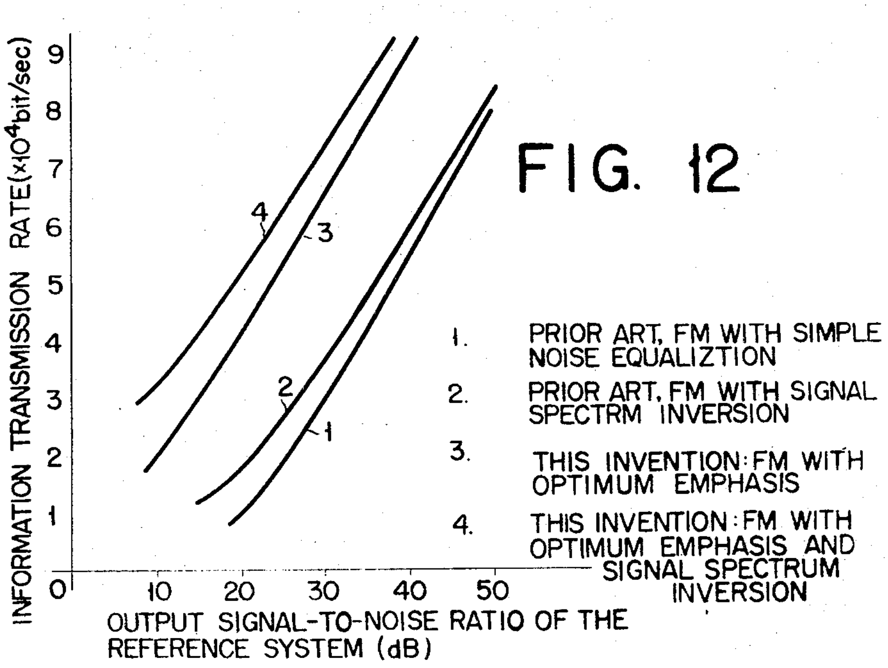
FIG. 12 is a curve showing the relationship of signal-to-noise ratio versus information-transmission rate, associated with the apparatus of FIG. 10 in comparison with that of the prior art.
Figures 11, 13:
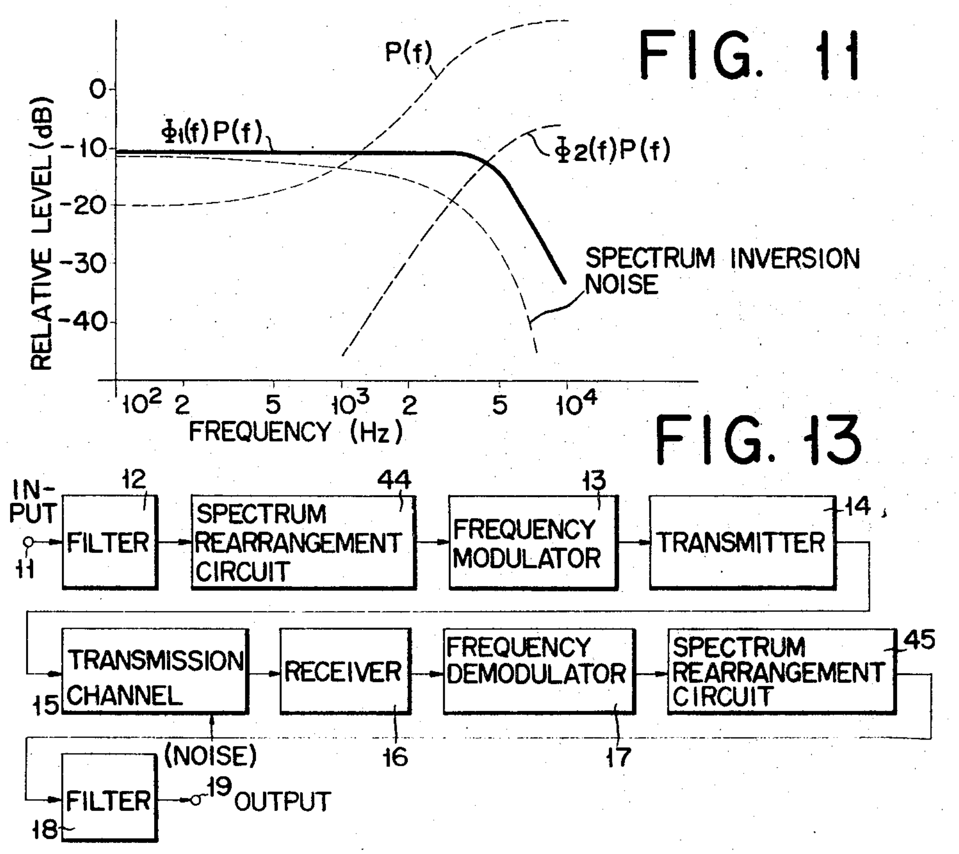
FIG. 11 is a curve illustrating the frequency spectra of signals representing both speech and frequency modulation noise associated with the communication system of the invention.
FIG. 13 is a block diagram of still another embodiment of the invention.

With $f_2$ = 8,000 Hz, such inversion of the frequency spectrum of noises will, as shown in FIG. 11, further improve the signal-to-noise ratio in the voiceless component. Accordingly, even if the signal-to-noise ratio in the voiced component slightly decreases, the overall articulation will be increased due to the improved signal-to-noise ratio in the voiceless component.

Where there is applied a frequency spectrum inversion process in a simple frequency modulation communication system, i.e., a type not involving equalization, then there is obtained, as shown in FIG. 12, only a slight improvement in the information-transmission rate with respect to the voiceless component. However, with the frequency modulation communication system of the present invention using a frequency inversion circuit in addition to the optimum filter, the signal-to-noise ratio with transmission channel required to obtain the same information transmission rate is allowed to be about 4 to 6 dB lower as compared to FM system with optimum filter only. This means that the signal-to-noise ratio can be increased 10 to 12 dB over what has been possible with the prior art frequency modulation communication system. As mentioned above, the present invention realizes the effective compression of frequency bandwidths, offering great practical advantage.

FIG. 17 illustrates a modification of FIG. 10 with the positions of filter 12 and inversion circuit 42 reversed and the positions of filter 18 and inversion circuit 43 reversed. This arrangement operates similarly to the arrangement of FIG. 10.

Further, it is possible to replace the frequency spectrum inversion circuit 42 in the transmission side with, as shown in FIG. 13, a frequency spectrum rearrangement circuit 44 for separating the frequency spectrum into suitable divisions and interchanging said divisions for each other and also to replace the frequency spectrum inversion circuit 43 in the receiving side with a frequency spectrum rearrangement circuit 45 for bringing the frequency spectrum of its input back to the original state when they were initially introduced into the frequency spectrum rearrangement circuit 44 in the transmission side. This process will display substantially the same effect. Namely, separation of the speech frequency spectrum into suitable divisions and interchange of a high frequency region for a low frequency region or vice versa will also enable the signal-to-noise ratio to be improved with respect to the voiceless component, so that the aforementioned interchange of the respective divisions of the frequency spectrum will give substantially the same result.

There will now be described by reference to FIGS. 14 and 15 the frequency spectrum rearrangement circuit 44 in the transmission side and the frequency spectrum rearrangement circuit 45 in the receiving side. Referring to FIG. 15, us consider the case where signals having frequency a band $f_1$ to $f_0$ as involved in the signals having frequency bands $f_1$ to $f_2$ ($f_1 < f_0 < f_2$) are shifted as they are to the region of frequency bands $f_2 - (f_0 - f_1)$ to $f_2$ with the frequency bands ranging from $f_0$ to $f_2$ reversed and shifted to $f_1$ to $f_1 + (f_2 - f_0)$. The component $f_1$ to $f_0$ involved in the frequency band $f_1$ to $f_2$ of input signals supplied to the input terminal 46 is amplitude modulated in a first amplitude modulator 47 by an oscillated frequency $f_2 + f_1$ from a first oscillator 48 and then passes through a first band pass filter 49 to cause the frequency spectrum to be inverted by taking out the lower side band component $f_1$ to $f_2$ and thereafter again amplitude modulated in a second amplitude modulator 50 by an oscillated frequency $2f_2 - (f_0 - f_1)$ from a second oscillator 51 and then passes through a low pass filter 52 to allow the frequency spectrum to be again inverted by taking out a lower side band component $f_2 - (f_0 - f_1)$ to $f_2$, which is later supplied to a summing circuit 53. On the other hand, the component $f_0$ to $f_2$ involved in the frequency band $f_1$ to $f_2$ of input 1 signals supplied to the input terminal 46 is amplitude modulated in the first amplitude modulator 47 by an oscillated frequency $f_2 + f_1$ from the first oscillator 48 and then passes through a second band pass filter 54 to cause the frequency spectrum to be inverted by taking out the portion $f_1$ to $f_2 - (f_0 - f_1)$ involved in said lower side band component, said portion $f_1$ to $f_2 - (f_0 - f_1)$ being later supplied to the summing circuit 53. Accordingly, at an output terminal 55 there is obtained a signal wherein the high frequency component is interchanged for a low frequency component and the low frequency component thereof for a high frequency component. When, in the receiving side, the low frequency component of the input signal is interchanged for a high frequency component and the high frequency component thereof is interchanged for a low frequency component, then the frequency characteristics of said input signal can be easily brought back to the original state.

What we claim is:

1. A frequency modulation communication system for improving the articulation of speech signals which include voiced and unvoiced signal components, said system comprising:

a frequency modulation transmission means including a first filter for modifying the frequency characteristics of the voiced and unvoiced components of said speech signals prior to frequency modulation of said speech signals, the frequency characteristics P(*f*) of said first filter being:

$$P(f) = \frac{S_1 \times 10^{-3}}{5.17 \times \phi_1(f) + 2.78 \times \phi_2(f)}$$

where:

$\Phi_1(f)$: statistical average power spectral density of said voiced component, $\Phi_2(f)$: statistical average power spectral density of said unvoiced component, $S_1$ : statistical average power of voiced component; and a frequency modulation receiving means for receiving signals transmitted from said transmission means and including a frequency demodulator and a second filter coupled to the output of said demodulator for bringing the frequency characteristics of the voiced and unvoiced components of said received speech signals back to the original state of said speech signals, the frequency characteristics of said second filters being:

$$1/P(f).$$

2. A frequency modulation communication system according to claim 1 wherein the first filter comprises a first resistor and first condenser connected in series between one of paired input terminals and one of paired output terminals, the input terminals of the first filter being coupled to the input of said transmitter and a second resistor, first coil and second condenser connected in series between said paired output terminals; and the second filter comprises a third resistor and second coil connected in series between one of paired input terminals and one of paired output terminals associated with said second filter, the output terminals of the second filter being coupled to the output of said receiver, and a fourth resistor, third coil and third condenser connected in series between said paired output terminals of said second filter.

3. A frequency modulation communication system accordding to claim 1 comprising an instantaneous compression circuit coupled to the output side of the first filter and an instantaneous expander coupled to the input side of the second filter.

4. A frequency modulation communication system according to claim 1 comprising an instantaneous compression circuit coupled to the input side of the first filter and an instantaneous expander coupled to the output side of the second filter.

5. A frequency modulation communication system according to claim 1 comprising a syllabic compressor coupled to the output side of the first filter and a syllabic expander coupled to the input side of the second filter.

6. A frequency modulation communication system according to claim 1 comprising a syllabic compressor coupled to the input side of the first filter and a syllabic expander coupled to the output side of the second filter.

7. A frequency modulation communication system according to claim 1 comprising a first frequency spectrum inverter connected to the output side of the first filter and a second frequency spectrum inverter connected to the input side of the second filter.

8. A frequency modulation communication system according to claim 2 comprising a first frequency spectrum rearrangement circuit coupled to the output of the first filter for separating a transmission signal into a plurality of frequency bands for interchange of frequency spectra; and a second frequency spectrum rearrangement circuit coupled to the input of the second filter for bringing the frequency spectrum of an input signal thereto back to that of the original transmission signal.

9. A frequency modulation transmission system according to claim 8 wherein the first and second frequency spectrum rearrangement circuits respectively comprise an input terminal supplied with an input signal having a frequency band $f_1$ to $f_2$, a first amplitude modulator connected to said input terminal, a first oscillator for supplying said first amplitude modulator with signals having a frequency $f_2 + f_1$ so that the frequency component $f_1$ to $f_0$ is amplitude modulated by said first amplitude modulator, a first band pass filter for taking a lower band component $f_1$ to $f_2$ out of outputs from said amplitude modulator, a second amplitude modulator connected to said first band pass filter, a second oscillator for supplying said second amplitude modulator with signals having a frequency $2f_2 - (f_0 - f_1)$, a low pass filter for taking a lower band component $f_2 - (f_0 - f_1)$ to $f_2$ out of outputs from said second amplitude modulator, a second band pass filter for taking signals having a frequency component $f_1$ to $f_2 - (f_0 - f_1)$ out of outputs from the first amplitude modulator and a circuit for summing outputs from said low pass filter and those from said second band pass filter.

* * * * *